Oct. 19, 1943.  N. G. SCHREINER  2,331,937
WELDING
Filed April 17, 1940  2 Sheets-Sheet 1
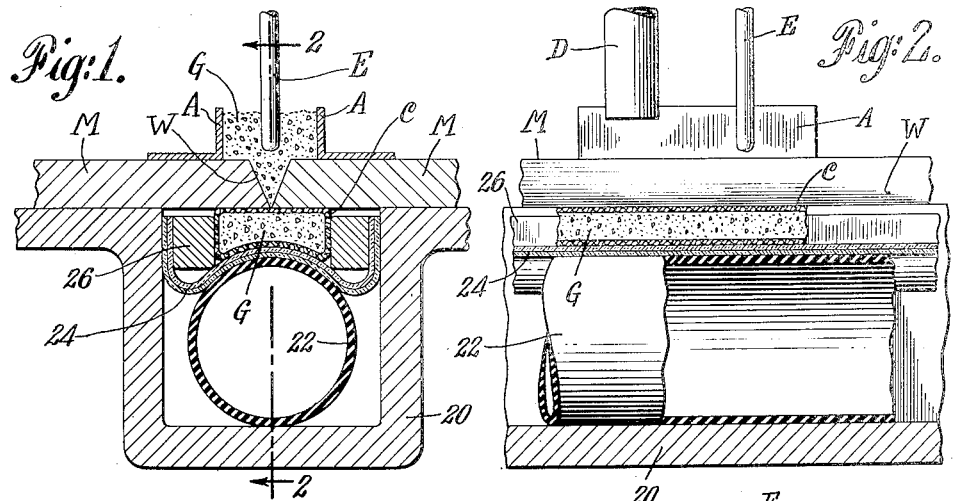
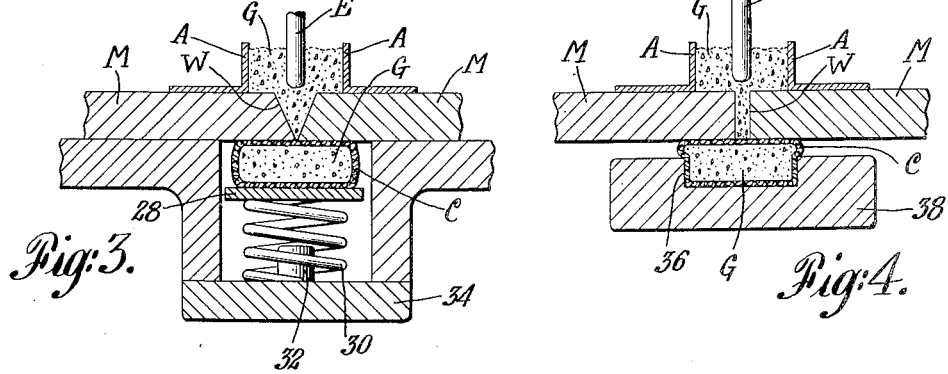
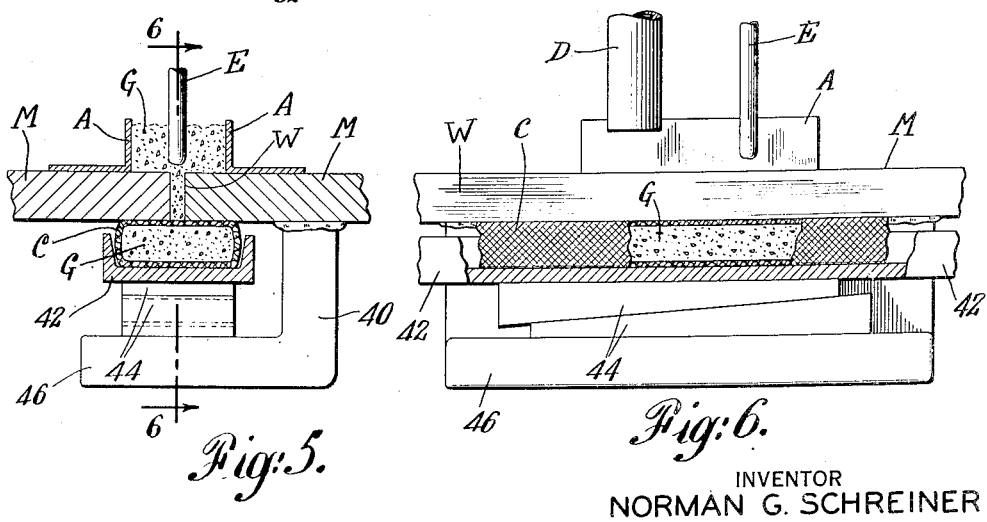
INVENTOR
NORMAN G. SCHREINER
BY
ATTORNEY Oct. 19, 1943.  N. G. SCHREINER  2,331,937
WELDING
Filed April 17, 1940   2 Sheets-Sheet 2
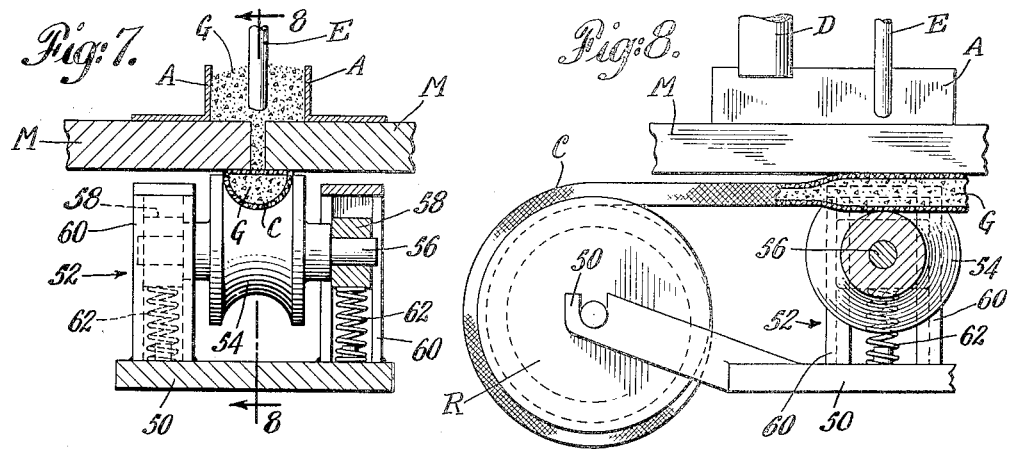
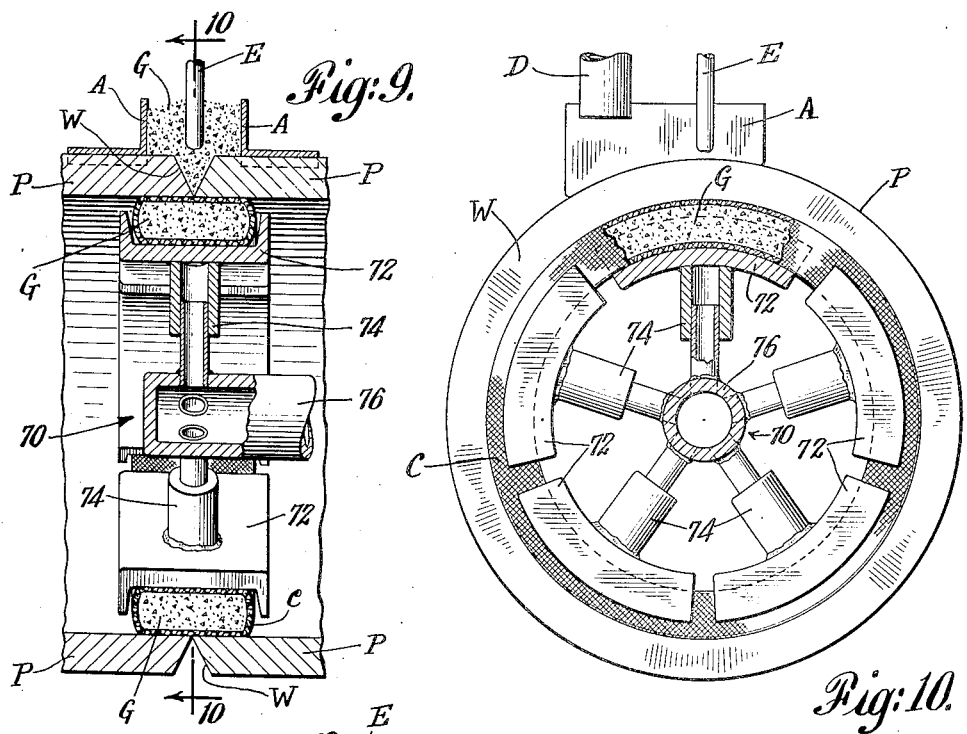
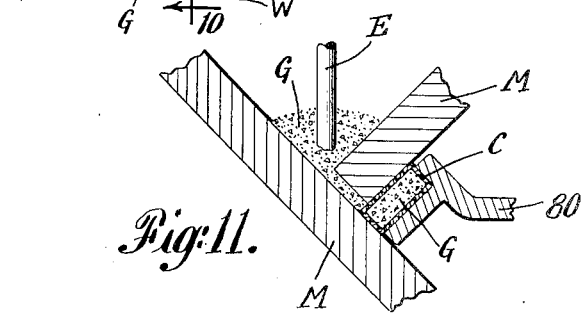
INVENTOR
NORMAN G. SCHREINER
BY
ATTORNEY Patented Oct. 19, 1943

2,331,937

UNITED STATES PATENT OFFICE 2,331,937

WELDING

Norman G. Schreiner, Philadelphia, Pa., assignor to The Linde Air Products Company, a corporation of Ohio Application April 17, 1940, Serial No. 329,999

7 Claims. (Cl. 113—59)

This invention relates to processes for joining metal members by welding, and more particularly to welding processes which require or which are aided by the provision of a backing means.

In such welding operations, a heavy strip of copper, steel, or other metal, known as a backing-up strip, is ordinarily applied to the surface of the members to be joined by welding, along the line of the welding seam and on the side opposite to that from which the welding operation is to be performed. The use of the backing-up strip prevents molten weld metal from running out of the welding seam and improves the appearance of the back surface of the weld. For convenience, the surface to which such a backing-up strip is applied will hereinafter be referred to as the "back" surface or side of the members to be welded or of the weld, and the term "front" surface will be applied to the obverse surface of the members or weld.

In some welding operations the benefits of a metal backing-up strip are accompanied by an undesirably strong chilling of the weld metal. Such undue chilling may set up harmful stresses and, moreover, the welding action along the deeper portions of a welding seam may be incomplete. In some cases, a dirty or unsound weld may result when premature setting of the weld metal occurs. Further, when the members to be welded are not perfectly flat, it is difficult to make the backing-up strip follow the surface closely enough to prevent the weld metal from spreading out between the backing-up strip and the back surface of the members being welded.

To overcome the shortcomings of metallic backing-up strips, it has been proposed to back up the weld with blocks or strips of ceramic or other refractory materials having relatively low thermal conductivity. But such materials are fragile and difficult to handle, and may moreover be attacked by fluxes used in the welding operation in such a manner as to interfere with the production of a sound weld.

It has been proposed in Patent No. 2,145,009, issued in the name of J. M. Keir, to back up the welding seam with a powdered or granular material disposed in a long trough or other suitable support. By this means the back of the welding seam is sealed against free access of air, and molten metal is prevented from rolling freely out of the seam. This method is satisfactory where the material to be welded is in a horizontal and stationary position and where there is sufficient space available and sufficient demand for use of the method to warrant the expense of installation. The method, however, is not readily applicable to the welding of girth seams on cylinders, such as pipes or pressure vessels, and to welding operations when the work is in other than a horizontal position, because of the difficulty in maintaining the backing material in position. The present invention is an improvement in the method and means described in Patent No. 2,145,009, and its principal aim is to improve its usefulness and to adapt it for wider application.

It is among the objects of this invention to provide an apparatus for backing up welding seams in which a granular fusible mineral backing material is enclosed within a flexible tube; to provide apparatus for maintaining a composite backing-up material in operative position against the back of the seam to be welded irrespective of the position of the members to be welded; to provide a flexible container of backing-up material which is transportable, adapted for convenient and economical storage, and easily movable into position for a welding operation; and to provide an apparatus for backing up welding seams which is simple, economical, and efficient in operation. Other objects will become apparent as the description proceeds.

The manner in which the objects of the invention are attained will become apparent from the following description and accompanying drawings, in which:

Fig. 1 is a cross-sectional view of one embodiment of the invention, illustrating a typical application of its use in the formation of a simple seam weld;

Fig. 2 is a sectional view on the line 2—2 of Fig. 1 looking in the direction of the arrows;

Fig. 3 is a sectional view of a modified form of the embodiment illustrated in Figs. 1 and 2;

Fig. 4 is a cross-sectional view illustrating an alternative embodiment of the invention;

Fig. 5 is a sectional view of a modified form of the embodiment illustrated in Fig. 4;

Fig. 6 is a longitudinal sectional view, partly in section, on the line 6—6 of Fig. 5 looking in the direction of the arrows;

Fig. 7 is a cross-sectional view of another embodiment of the invention;

Fig. 8 is a longitudinal view, partly in section, on the line 8—8 of Fig. 7;

Fig. 9 is a cross-sectional view of still another embodiment of the invention;

Fig. 10 is an elevational view, partly in section, on the line 10—10 of Fig. 9; and Fig. 11 is a cross-sectional view illustrating an embodiment of the invention as it may be used in the formation of a fillet weld.

Generally speaking, the objects of the invention are accomplished by enclosing the granular backing material in a flexible tube or casing of indefinite length, so that the backing material may thus be placed at will through suitable mechanism wherever it is required. The tube or casing is preferably loosely packed so that long lengths thereof may be reeled for ease in handling. Suitable means such as wedges, pneumatic tubes, expanding spiders, springs, or other suitable devices, may be used to press the tube or casing against the back of a seam to be welded to form a substantially tight closure therefor.

The granular fusible mineral material used in the invention may have a wide variety of compositions, but should preferably be of such a nature that it can be fused by welding heat. Suitably, it has a melting point not substantially higher than that of the metal to be welded, and is substantially free from gas-forming or other ingredients (such as uncombined iron oxide) harmful to the weld. Preferably, the material consists chiefly of silicates of the alkaline earth metals (magnesium being considered a member of the alkaline earth metal group). Fluidifiers such as calcium fluoride or manganese oxide may be added if desired. It is preferred that the ingredients of the welding material should be mixed, prefused to complete chemical reactions between the ingredients, and subsequently crushed or ground to the desired size.

In electric welding operations such as the one disclosed in Patent No. 2,043,960, issued in the names of Jones, Kennedy, and Rotermund, wherein the tip of the electrode or welding rod is buried under a blanket of mineral welding material, it is desirable to place the same kind of material in the casing for backing up the weld. Materials of the type above described are suited to both purposes.

Various materials may be used to form the flexible casing. The desirable characteristics of such a casing include sufficient strength to hold the material and permit of handling the filled casing, and ability of the casing to burn or fuse rapidly and substantially completely. Silk, artificial or synthetic fabrics and integuments, cotton, and wool are satisfactory materials. In general, it need not be expected that the entire casing will burn during the welding operation but only that portion of the fabric directly beneath the welding zone. Thereby, the amount of combustion products to be disposed of is minimized. In certain instances, spun glass fabric, or other similar material having the required strength may be used for the casing, as it may be fused with the granular backing material and eliminated without producing any gas. During the welding operation, the composite backing-up material is retained and pressed against the back side of the seam, a fabric portion thereof engaging directly against both metal members to be welded and bridging the seam while a granular material portion is pressed against such fabric portion.

Referring more particularly to the drawings, the members or plates M to be welded are arranged with their opposed edges in contiguous relation to form a groove or seam W to be welded. The type of welding illustrated is that in which the end of an electrode, such as a bare or uncoated metal welding rod E, is disposed beneath a blanket of granular mineral material G, which may be deposited on and along the seam W by suitable depositing means D, and retained in position thereon by suitable retaining means such as angles A. The same kind of granular material G may be used for backing purposes, and may be disposed within a tube or casing C.

While this type of welding has been illustrated as an example of how the invention may be practiced, the principles of the invention are applicable to any type of welding. For example, the invention may be used with electric welding employing a bare or coated metal electrode, or a carbon electrode, and may be used with other types of welding such as gas welding or thermit welding.

In the embodiment of the invention shown in Figs. 1 and 2, a supporting means such as a trough 20 is provided in which may be disposed a flexible pneumatic tube 22, which is placed in the trough in deflated condition. On top of the tube 22 are placed one or more layers of fire-resistant material, such as canvas 24, to the longitudinal edges of which may be secured metal blocks 26. The seam bridging and enclosing means or filled casing C is placed on top of the canvas 24 and when the tube 22 is inflated the bars or blocks 26 are disposed on either side of the casing to limit its lateral expansion and to retain it in position substantially centrally of the seam W. The tube 22 is inflated an amount sufficient to force the casing C into tight engagement with the members M and bars 26 to form a substantially tight seal at the back of the welding seam.

While a collapsible pneumatic tube has been illustrated as the means for forcing the filled casing C into bridging engagement with the back side of the seam, other suitable means may be used for this purpose. Thus in Fig. 3, the tube or casing C may be supported upon a plate 28, and urged into tight engagement with the members to be welded by springs 30 supported on centering devices 32 forming part of a trough 34.

A somewhat simpler arrangement, not utilizing any means for resiliently forcing the casing into engagement with the members to be welded, is illustrated in Fig. 4, wherein the casing C is disposed in a channel 36 formed in the upper surface of a bar or plate 38. In this instance, the members to be welded may be forced against the tube C by means of wedges or other suitable means.

Another arrangement for accomplishing the purposes of the invention is illustrated in Figs. 5 and 6. In this embodiment of the invention, a rigid support such as an angle bar 40 is welded to the back side of one of the members M to be weld united. The casing C is supported in a channel 42 and wedges 44 are operatively disposed between the channel and the horizontal leg 46 of the angle bar 40 to force the casing C into tight engagement with the back surface of the weld.

Figs. 7 and 8 illustrate the application of the invention to welding operations wherein the welding mechanism, such as the material depositing means D and the welding rod or electrode E, and the work move relatively to each other. In such a case, it is essential that a fresh supply of the granular backing material be disposed progressively beneath the seam in synchronism with the movement of the welding mechanism relatively to the work. To accomplish this result, the tube or casing C filled with the granular backing material G may be wound upon a reel R supported upon a bracket 50 forming part of a suitable traveling mechanism. Also mounted upon the bracket 50 is a mechanism 52 for progressively pressing successive portions of the casing C into tight engagement with the back of the welding seam. This latter mechanism may comprise rotatable means such as a grooved roller 54 and an axle 56, the ends of which are supported in bearing blocks 58. The bearings 58 are free to move vertically in guides 60 mounted upon the bracket 50, and are urged in an upward direction, as by springs 62. The bracket 50 is disposed substantially centrally of and beneath the welding rod or electrode E.

In operation, the casing C is threaded over the roller 54 beneath the seam to be welded. The roller and its associated parts progressively press successive portions of the casing into bridging engagement with the back side of the weld as the casing C is progressively unwound from the reel R during the progress of the welding operation.

Figs. 9 and 10 illustrate the application of the invention to the welding of circumferential or girth seams in cylindrical members P, such as pipes, tanks, and pressure vessels. For this purpose, the casing or tube C is preferably formed as an end-to-end joined member and is mounted upon an expanding spider 70 within member P. The spider 70 includes arcuate channel members 72 mounted upon telescoping arms 74, the interior of which is in communication with a hollow shaft or axle 76. The casing C is disposed around and within the channel members 72, and when fluid is admitted to the interior of the shaft or axle 76 the telescoping arms 74 will extend to urge the casing C into intimate engagement with the interior or back surfaces of the members P adjacent the seam W.

Fig. 11 illustrates the application of the invention to the forming of a fillet weld between metallic members M disposed at an angle to each other so that their upper surfaces form a trough for receiving the granular material G into which the end of the electrode E is inserted. Beneath the junction between the members M is disposed the casing C filled with the granular material G, and the casing may be held in position by suitable brackets 80 which may be forced into engagement with the back side of the weld by suitable means, such as springs, wedges, or a collapsible pneumatic tube as illustrated in Figs. 1 and 2.

An important advantage of the invention is that in many cases it eliminates the necessity for beveling the edges of the members to be welded. It has been found in practicing the invention that it is not only possible but in some cases actually preferable to make the weld with square cut edges as shown in Figs. 4, 5, and 7, for the provision of the backing-up material in the manner shown makes it possible to assemble the objects to be welded with a substantial gap between them, thereby insuring at the same time the formation of a bead along the back surface of the weld and a weld of substantially uniform width and strength from back to front. It will be evident, however, that objects having beveled edges may in like manner be assembled for welding, with a gap between the contiguous back edges of the seam in order to insure the formation of a bead along the back surface of the weld. This is illustrated in Figs. 1, 3, and 9.

When the welding operation is carried out with a suitable backing material in a flexible casing or tube, there is formed along the back of the weld a convex surface or bead similar to that customarily formed on the front surface of a weld, and this result constitutes one of the important advantages of this method, for it not only insures thorough bonding along the back of the weld but produces a double bead without the necessity for making a separate bead weld along the back surface of the weld.

The backing material loosely packed in a flexible tube or casing is of particular advantage in connection with electric welding, by making it possible and even desirable to employ an exceptionally high current density and to weld at an unusually high speed, which greatly increases the economy of the welding operation.

In practice, the fusion of the backing-up material in the casing provides room for the formation of a bead, and the fusion of the granular material in combination with the prevention of free access of air, which is a feature of the invention, results in a weld, the back surface of which is not only beaded but clean and free from irregularities. Additionally, the weld metal itself is substantially free of gas bubbles and slag inclusions which are common when metal backing-up strips are used.

From the foregoing, it will be apparent that the method and apparatus of the invention are effective to provide backing for a weld irrespective of whether the work is in a horizontal or non-horizontal position, and are effective irrespective of the length or surface condition of the work. The invention is particularly adapted to installations where the provision of the backing material in a stationary trough is not practical.

While preferred embodiments of the invention have been described and illustrated, it will be readily apparent to those skilled in the art that the invention may be otherwise embodied and practiced and that physical changes may be made in the dimensions and form of the illustrated elements without departing from the scope of the invention.

What is claimed is:

1. In combination, means for depositing hot molten metal progressively along a seam between the opposed edges of two juxtaposed metal members to produce a welded joint uniting said members; and means for bridging and enclosing the side of said seam opposite to that along which said hot molten metal is deposited with a non-adhering mass of unbonded granular refractory fusible mineral material, said bridging and enclosing means comprising an elongated tubular flexible casing of fabric which is substantially completely combustible at the temperature of the hot molten metal, and which casing is filled with said material and extends longitudinally of the back side of said seam, and supporting means operative to press the casing into bridging engagement with the side of said seam opposite to that along which said hot molten metal is deposited and against the metal members for a substantial distance on each side of said seam.

2. The combination claimed in claim 1, in which said supporting means comprises a trough in which said casing is disposed and expansible means engaging said trough and said casing.

3. In the combination claimed in claim 1, means for limiting the lateral expansion of said casing and retaining it substantially centrally of said seam.

4. The combination claimed in claim 1, in which said supporting means comprises a rigid support and cooperating wedges operatively disposed between said support and said casing.

5. In combination, means for depositing hot molten metal progressively along a seam between the opposed edges of two juxtaposed metal members to produce a welded joint uniting said members; and means for bridging and enclosing the side of said seam opposite to that along which said hot molten metal is deposited with a nonadhering mass of unbonded granular refractory fusible mineral material, said bridging and enclosing means comprising an elongated tubular flexible casing of fabric which is substantially completely combustible at the temperature of the hot molten metal, and which casing is filled with said material, and means, movable relatively to said seam in synchronism with said metal depositing means, to press successive portions of said casing progressively into bridging engagement with the side of said seam opposite to that along which said hot molten metal is deposited and against the metal members for a substantial distance on each side of said seam.

6. The combination claimed in claim 5, in which said movable means comprises a traveling mechanism; a reel mounted upon said mechanism, said casing being wound upon said reel; and rotatable means, resiliently mounted upon said mechanism and progressively pressing successive portions of said casing into bridging engagement with the back side of said seam.

7. In combination, means for depositing molten metal progressively along a seam between the opposed edges of two metal members to produce a welded joint uniting said members; means for bridging and enclosing the side of said seam opposite to that along which said molten metal is deposited, to confine molten metal along such opposite side of said seam and produce a smooth bead of weld metal along such opposite side, said bridging and enclosing means comprising a portion of unbonded granular fusible material and a portion of fabric, said fabric being completely combustible at the temperature of such molten metal, said fabric portion directly engaging said metal members and bridging said seam; and means for supporting and retaining said bridging and enclosing means in position along said opposite side of said seam in overlapping relation with said metal members for a substantial distance on each side of said seam, with at least a part of said fabric portion disposed intermediate said portion of mineral material and said metal members, the construction and arrangement being such that said metal members and said bridging and enclosing means are held together to press the fabric into bridging engagement with the side of said seam opposite to that along which the molten metal is deposited and against said metal members.

NORMAN G. SCHREINER.